V. O. STROBEL & S. BUCKLEY.
POWER SYSTEM.
APPLICATION FILED MAY 29, 1913.
1,188,570.
Patented June 27, 1916.
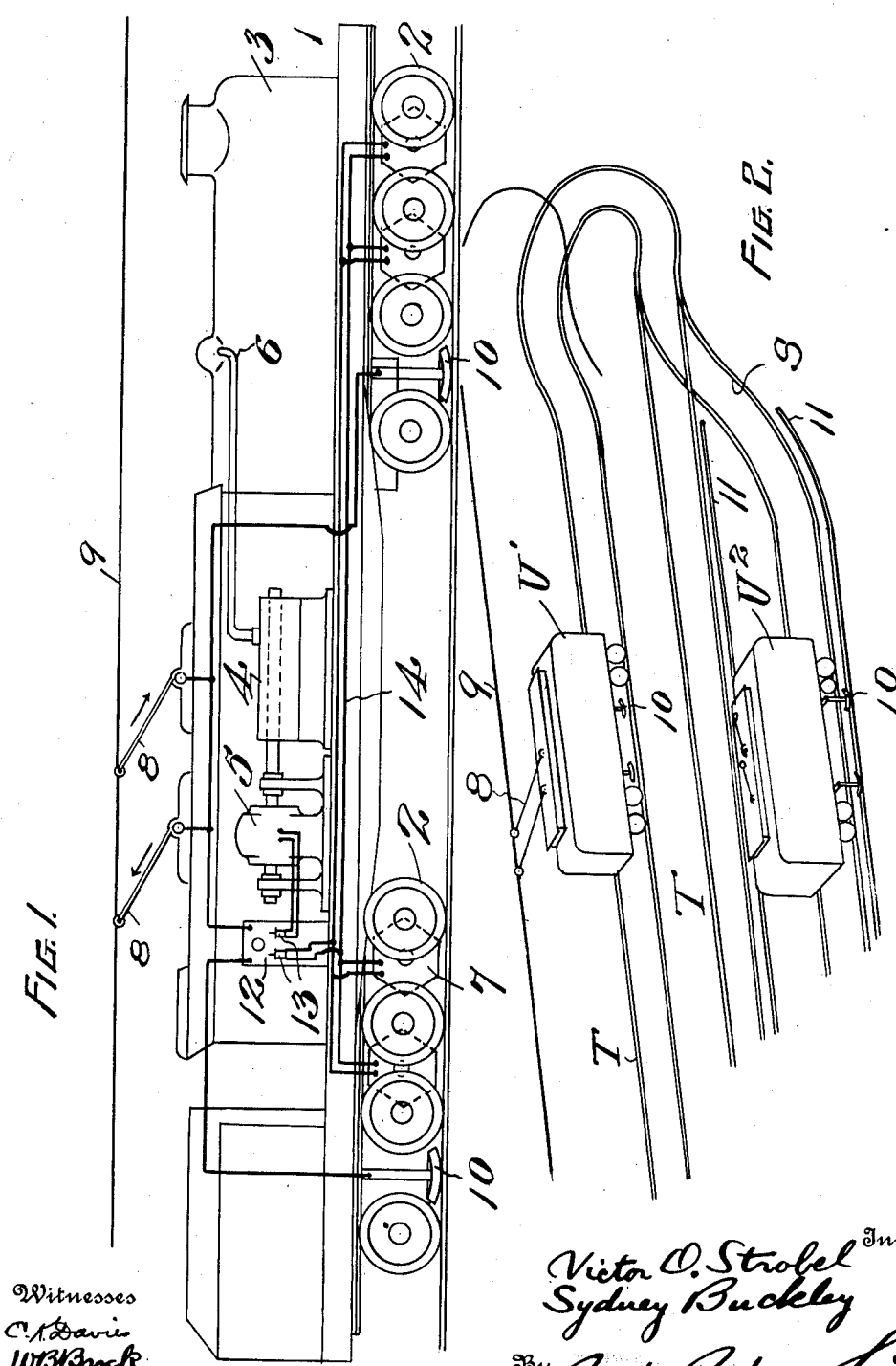

UNITED STATES PATENT OFFICE.

VICTOR O. STROBEL AND SYDNEY BUCKLEY, OF PHILADELPHIA, PENNSYLVANIA.

POWER SYSTEM.

1,188,570.  Specification of Letters Patent.  Patented June 27, 1916.

Application filed May 29, 1913. Serial No. 770,623.

*To all whom it may concern:*

Be it known that we, VICTOR O. STROBEL and SYDNEY BUCKLEY, citizens of the United States, and residents of the city of Philadelphia, in the State of Pennsylvania, have invented a certain new and useful Power System, of which the following is a specification.

The principal object of the invention is to provide an efficient and economical traction system, by providing means by which a plurality of prime mover units employed in the system may coöperate in the manner hereinafter set forth.

Our invention is intended to apply with greatest advantage to traction lines, such as railroads, which now employ a large number of locomotives as prime movers.

In carrying out the invention, we substitute for ordinary steam locomotives a locomotive unit comprising a prime mover, such as a steam turbine, a steam boiler therefor, an electrical generator connected with the turbine, one or more electric motors suitably coupled to the driving wheels of the locomotive, necessary wiring and controlling devices, and line contacts, such as trolleys or third rail plows, or collectors. The track is then provided with an overhead trolley or third rail, or both. There are then distributed over the line a plurality of locomotive units, some of which are in motion, hauling trains, and some of which are standing in round houses, in terminal yards, and on sidings along the line. For ordinary hauling through the country, the locomotive units operate their boilers and turbines to drive their electric generators, and the generators in turn energize the motors to drive the locomotive and haul its load. Excess current generated by any unit may be supplied to the line, or additional current required for use by any unit may be drawn from the line. Any or all of the locomotive units which are standing may operate their steam boilers, turbines and generators to supply current to the line. In this way the units may give useful service not only when actually moving over the line, but when standing. When the traveling locomotives approach towns or thickly settled communities in which smoke is objected to, operation of the steam engine and generator may be discontinued and forced draft taken off the boiler, so that no smoke is produced, and then the locomotive and its load are driven by current taken from the line and supplied to the motors.

From the foregoing general description of a physical embodiment of the invention, the following additional objects and advantages will be easily understood: Large investments for generating plants at different points along a line are avoided, the separate locomotive units supplying the function of generators for the line. Moreover, by their wide distribution over the system, and by their comparative average closeness to each other, the proper voltage is maintained on the line without special devices such as boosters or high tension transmission with its necessary transformers. Independent electric locomotives for hauling trains through cities, to comply with antismoke regulations, are avoided, since our regular locomotive unit, as above described, may be used either for country or city hauling. Each unit, moreover, operates at very high efficiency by reason of the employment of a high-speed prime mover, such as the steam turbine above described, in connection with a suitable electrical generator, whereby electrical energy is efficiently and economically produced.

Of course, the invention is not limited to the employment of a steam engine as the prime mover. An internal combustion engine may be employed and this may be supplied with liquid fuel or with gas carried in tanks or generated in a gas producer on the vehicle. The invention also applies to signal transportation units, comparable to single trolley cars, or to locomotives for hauling trains.

We will now describe one exemplifying embodiment of the invention, reference being made to the accompanying diagrammatic drawing.

Figure 1 is a side elevation of a typical form of locomotive, and Fig. 2 is a fragmentary diagram of a traction system showing two of the locomotives.

Reference character 1 designates a locomotive frame supported on trucks 2, of which any or all of the wheels may be drivers. On the frame is a steam boiler 3, a steam turbine 4, and an electric generator 5 coupled to the turbine. Steam is supplied from the boiler to the turbine through pipe 6, and there are suitable steam controlling devices, the details of which are not essential and, therefore, not described. Carried by one or both of the trucks are one or more electric motors 7 suitably geared to one or more of the driving wheels. The locomotive carries one or more trolleys 8 to provide electrical connection with an overhead trolley wire 9, and one or more plows or collectors 10, to provide electrical connection with a third rail 11. There is a suitable switchboard 12 on the locomotive with necessary switches 13 and other indicating and controlling instruments, and there is suitable wiring 14 interconnecting the generator 5, switchboard 12, motors 7, trolleys 8, and collectors 10.

As shown in Fig. 2, a plurality of such units may be employed on a system in which the main line is designated by reference character T, and a yard, round house, or siding, by the character S, it being understood, of course, that the main line and sidings and so on may be multiplied indefinitely. The overhead trolley wire 9 may be used in country districts and the third rail 11 in cities, or either, or both may be used, and the trolleys 8 and collectors 10 may be provided or omitted accordingly, and they are manipulated in an obvious way in changing from one transmission line to the other.

In Fig. 2 the unit designated by character U' is running, the steam turbine supplied with steam from boiler 3 driving the generator 5, and the generator in turn driving the electric motors 7. The unit designated by character $U^2$ is standing on a siding, its steam turbine 4 and generator 5 are in operation, and the electric current so produced is supplied to the line through the third rail 11, the third rail and overhead wire being, of course, suitably electrically connected. When unit U' comes to a settled district, operation of the prime mover is discontinued, and the electric switch is properly manipulated so that the electric motors 7 are driven by current drawn from either the overhead wire 9 or the third rail 11. It is obvious that any unit in operation may draw from the line in an emergency, and it will also be obvious that the generator units may be operated in many different ways to produce desired results. It will also be evident that a track is not essential. Trackless trolley vehicles may be employed, in connection with an overhead transmission wire.

We claim:—

1. A power system comprising an electric transmission line and a plurality of locomotive units, each unit comprising a prime mover, an electric generator, an electric driving motor, line contacts for connecting the units electrically through the line, and current controlling devices.

2. In a power system, a plurality of locomotive units each comprising a prime mover, an electric generator connected therewith, one or more drive wheels, one or more electric motors connected with said wheels, and electrical line contacts for connecting the units electrically through the line; and an electrical transmission line connecting a plurality of said units through said contacts.

3. In a power system, the combination of an electric transmission line, a plurality of locomotive units electrically connected with said line, each unit comprising a prime mover and an electro-generator, and means by which one or more of said units may supply energy to the line or draw energy therefrom, as desired.

VICTOR O. STROBEL.
SYDNEY BUCKLEY.

Witnesses:
MARMADUKE D. SMITH,
LINCOLN KEELEY.